United States Patent
Takemura et al.

(10) Patent No.: US 9,322,957 B2
(45) Date of Patent: Apr. 26, 2016

(54) METHOD FOR PRODUCING OPTICAL MATERIAL

(71) Applicant: MITSUBISHI GAS CHEMICAL COMPANY, INC., Tokyo (JP)

(72) Inventors: Kouhei Takemura, Osaka (JP); Hiroyuki Okada, Osaka (JP); Hiroshi Horikoshi, Chiba (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/379,597

(22) PCT Filed: Feb. 26, 2013

(86) PCT No.: PCT/JP2013/054935
§ 371 (c)(1),
(2) Date: Aug. 19, 2014

(87) PCT Pub. No.: WO2013/140959
PCT Pub. Date: Sep. 26, 2013

(65) Prior Publication Data
US 2015/0011704 A1 Jan. 8, 2015

(30) Foreign Application Priority Data

Mar. 19, 2012 (JP) ................................. 2012-061765

(51) Int. Cl.
| | | |
|---|---|---|
| C08G 18/00 | (2006.01) | |
| G02B 1/04 | (2006.01) | |
| C08G 18/38 | (2006.01) | |
| C08G 75/08 | (2006.01) | |
| C08G 18/76 | (2006.01) | |
| C08K 5/053 | (2006.01) | |
| C08K 5/3475 | (2006.01) | |
| G02B 1/00 | (2006.01) | |

(52) U.S. Cl.
CPC .............. *G02B 1/04* (2013.01); *C08G 18/3855* (2013.01); *C08G 18/3868* (2013.01); *C08G 18/3874* (2013.01); *C08G 18/3876* (2013.01); *C08G 18/7642* (2013.01); *C08G 75/08* (2013.01); *C08K 5/053* (2013.01); *C08K 5/3475* (2013.01); *G02B 1/00* (2013.01)

(58) Field of Classification Search
CPC ............ G02B 1/04; G02B 1/00; C08K 5/053; C08K 5/3475; C08G 18/3855; C08G 18/3868; C08G 18/3874
See application file for complete search history.

(56) References Cited

U.S. PATENT DOCUMENTS

| | | |
|---|---|---|
| 2004/0122201 A1 | 6/2004 | Yoshimura et al. |
| 2004/0254258 A1 | 12/2004 | Horikoshi et al. |
| 2007/0149639 A1 | 6/2007 | Horikoshi et al. |
| 2010/0004421 A1 | 1/2010 | Horikoshi et al. |
| 2012/0123081 A1 | 5/2012 | Okada et al. |

FOREIGN PATENT DOCUMENTS

| | | |
|---|---|---|
| JP | 2002-120233 | 4/2002 |
| JP | 2002-122701 | 4/2002 |
| JP | 2004-43526 | 2/2004 |
| JP | 2004-339329 | 12/2004 |
| JP | 2008-101190 | 5/2008 |
| JP | 2012-167199 | 9/2012 |
| WO | 2011/007749 | 1/2011 |

OTHER PUBLICATIONS

Search report from International Bureau of WIPO in PCT/JP2013/054935, mail date is May 7, 2013.

*Primary Examiner* — Michael L Leonard
(74) *Attorney, Agent, or Firm* — Greenblum & Bernstein, P.L.C.

(57) ABSTRACT

A method for producing an optical material includes a predetermined compound (a), compound (b), compound (c), compound (d), and compound (e). The method minimizes the occurrence of a defect where peeling traces are left on a lens. The first to the fifth step minimizes the defect where peeling traces are left. First: dissolving the compound (b) into the compound (a) to obtain a first solution. Second: adding the compound (e) to the first solution obtained in the first step and then mixing to obtain a second solution not comprising the compound (d). Third: adding the compound (c) to the second solution obtained in the second step to obtain a reaction mixture. Fourth: adding the compound (d) to the reaction mixture obtained in the third step and then mixing to obtain a resin composition for an optical material. Fifth: cast-molding the resin composition and then polymerizing to obtain the optical material.

5 Claims, No Drawings

METHOD FOR PRODUCING OPTICAL MATERIAL

TECHNICAL FIELD

The present invention relates to a method for producing an optical material for a plastic lens, a prism, an optical fiber, an information recording substrate, a filter or the like, in particular an optical material suitably used for a plastic lens, and the like.

BACKGROUND ART

Plastic lenses are lightweight, highly tough and easy to be dyed. Properties particularly required for plastic lenses are: low specific gravity; high transparency; low yellowness; high refractive index and high Abbe number as optical properties; high heat resistance; high strength; and the like. A high refractive index allows a lens to be thinner, and a high Abbe number reduces the chromatic aberration of a lens.

Recently, many organic compounds having a sulfur atom and/or a selenium atom to be used for providing a high refractive index and a high Abbe number have been reported. Among such compounds, polyepisulfide compounds having a sulfur atom are known to provide a good balance between the refractive index and the Abbe number. For this reason, there is a report of an optical material, in which sulfur was introduced in a polyepisulfide compound in order to maintain the refractive index and thiourethane was introduced in the compound in order to improve impact resistance (Patent Document 1).

However, optical materials obtained by introducing sulfur and thiourethane in a polyepisulfide compound have problems of foam formation, heat generation, etc. at the time of the production. For this reason, there is a report of a method for producing an optical material, in which a product obtained by preliminarily polymerizing an episulfide compound with a sulfur atom is reacted with a product obtained by preliminarily polymerizing a compound having an isocyanate group with a compound having a mercapto group, for the purpose of controlling the above-described problems (Patent Document 2).

PRIOR ART DOCUMENTS

Patent Documents

Patent Document 1: Japanese Laid-Open Patent Publication No. 2002-122701
Patent Document 2: Japanese Laid-Open Patent Publication No. 2004-339329

SUMMARY OF THE INVENTION

Problems to be Solved by the Invention

However, in the production of the above-described optical materials, particularly plastic lenses for eyeglasses, the yield may be reduced due to a defect where peeling traces are left, and it is required to improve this. A defect where peeling traces are left is a defect where peeling traces are left on a lens when released from a mold after polymerization and curing, and when this occurs, it becomes impossible to use the product as a lens. Such a defect where peeling traces are left occurs particularly in the case of powerful minus lenses, and the improvement thereof has been desired.

That is, the problem to be solved by the present invention is to provide a method for producing an optical material which can improve reduction in the yield due to a defect where peeling traces are left at the time of producing an optical material having a high refractive index, an optical material and an optical lens where the occurrence of peeling traces is inhibited, and the like, and in particular, to make it possible to inhibit the occurrence of a defect where peeling traces are left in the case of powerful minus lenses.

Means for Solving the Problems

Under such circumstances, the present inventors diligently made researches and solved the problems by a method for producing an optical material comprising a compound (a), a compound (b), a compound (c), a compound (d) and a compound (e) described below as raw materials, wherein a first step to a fifth step described below are undergone, and thus the present invention was arrived at:

the first step: a step of dissolving the compound (b) in the compound (a) to obtain a first solution;
the second step: a step of adding the compound (e) to the first solution obtained in the first step and then mixing to obtain a second solution not comprising the compound (d);
the third step: a step of adding the compound (c) to the second solution obtained in the second step to obtain a reaction mixture;
the fourth step: a step of adding the compound (d) to the reaction mixture obtained in the third step and then mixing to obtain a resin composition for an optical material;
the fifth step: a step of cast-molding the resin composition for an optical material obtained in the fourth step and then polymerizing to obtain the optical material;
the compound (a): a compound having the structure represented by the following formula (1):

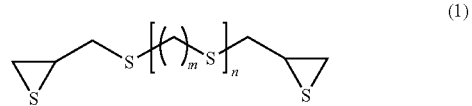

wherein m represents an integer from 0 to 4, and n represents an integer from 0 to 2;
the compound (b): sulfur;
the compound (c): at least one compound selected from m-xylylene diisocyanate, p-xylylene diisocyanate, m-tetramethyl xylylene diisocyanate, p-tetramethyl xylylene diisocyanate, 1,3-bis(isocyanate methyl)cyclohexane, 1,4-bis(isocyanate methyl)cyclohexane, bis(isocyanate methyl) norbornene and 2,5-diisocyanatemethyl-1,4-dithiane;
the compound (d): at least one compound selected from bis(2-mercaptoethyl)sulfide, 2,5-bis(2-mercaptoethyl)-1,4-dithiane, 1,3-bis(mercaptomethyl)benzene, 1,4-bis(mercaptomethyl)benzene, 1,2-bis(2-mercaptoethylthio)-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, and 1,1,3,3-tetrakis(mercaptomethylthio)propane;
the compound (e): at least one compound selected from pentaerythritol tetrakis-mercaptopropionate, pentaerythritol tetrakis-thioglycolate, trimethylolpropane tris(2-mercapto acetate) and trimethylolpropane tris(3-mercapto propionate).

Advantageous Effect of the Invention

The optical material obtained by polymerizing and curing the above-described composition has a balance between a sufficiently high refractive index and a good Abbe number, which was difficult to obtain when using compounds of prior art as raw materials. Moreover, according to the present invention, it is possible to provide a method for producing an optical material which can improve reduction in the yield due to a defect where peeling traces are left an optical material and an optical lens where the occurrence of peeling traces is inhibited, and the like, and in particular, it is possible to inhibit the occurrence of a defect where peeling traces are left in the case of powerful minus lenses.

BEST MODE FOR CARRYING OUT THE INVENTION

The present invention is as follows:
1. A method for producing an optical material comprising the compound (a), the compound (b), the compound (c), the compound (d) and the compound (e) described above as raw materials, wherein a first step to a fifth step described below are undergone:
   the first step: a step of dissolving the compound (b) in the compound (a) to obtain a first solution;
   the second step: a step of adding the compound (e) to the first solution obtained in the first step and then mixing to obtain a second solution not comprising the compound (d);
   the third step: a step of adding the compound (c) to the second solution obtained in the second step to obtain a reaction mixture;
   the fourth step: a step of adding the compound (d) to the reaction mixture obtained in the third step and then mixing to obtain a resin composition for an optical material; and
   the fifth step: a step of cast-molding the resin composition for an optical material obtained in the fourth step and then polymerizing to obtain the optical material.
2. The method for producing an optical material according to item 1 above, wherein, when the total amount of the compound (a), the compound (b), the compound (c), the compound (d) and the compound (e) is 100 wt %, the compound (a) is in an amount of 60 to 95 wt %; the compound (b) is in an amount of 0.1 to 5 wt %; the compound (c) is in an amount of 1 to 15 wt %; the compound (d) is in an amount of 1 to 15 wt %; and the compound (e) is in an amount of 1 to 15 wt %, and wherein the ratio of all the SH groups in the compound (d) and the compound (e) to the NCO groups in the compound (c), i.e., [the total number of the SH groups in the compound (d) and the compound (e)/the number of the NCO groups in the compound (c)] (SH group/NCO group) is 1.0 to 2.5.
3. The method for producing an optical material according to item 1 above, wherein an onium salt, as a polymerization catalyst, is added in an amount of 0.0001 to 10 wt % relative to the total amount of (a) to (e) in the second step.
4. The method for producing an optical material according to item 1 above, wherein in the third step, the reaction temperature is 0 to 30° C. and the reaction time is 0.5 to 12 hours.
5. An optical material obtained by the production method according to any one of items 1 to 4 above.
6. An optical lens made of the optical material according to item 5 above.
7. A method for producing a resin composition for an optical material comprising the compound (a), the compound (b), the compound (c), the compound (d) and the compound (e) described above as raw materials, wherein a first step to a fourth step described below are undergone:
   the first step: a step of dissolving the compound (b) in the compound (a) to obtain a first solution;
   the second step: a step of adding the compound (e) to the first solution obtained in the first step and then mixing to obtain a second solution not comprising the compound (d);
   the third step: a step of adding the compound (c) to the second solution obtained in the second step to react 10 to 70% of the compound (c) with the compound (e) to obtain a reaction mixture; and
   the fourth step: a step of adding the compound (d) to the reaction mixture obtained in the third step and then mixing to obtain the resin composition for an optical material.

Hereinafter, raw materials to be used in the present invention, i.e., the compound (a), the compound (b), the compound (c), the compound (d) and the compound (e) will be described in detail.

Compound (a)

The compound (a) to be used in the present invention is a compound having the structure represented by formula (1) below. When the total amount of the compounds (a) to (e) is 100 wt %, the amount of the compound (a) to be added is usually 60 to 95 wt %, preferably 70 to 90 wt %, and particularly preferably 75 to 85 wt %. When the amount of the compound (a) to be added is less than 60 wt %, the heat resistance may be reduced, and when the amount is more than 95 wt %, the strength may be reduced.

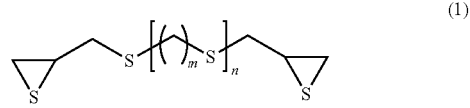

(1)

(In the formula, m represents an integer from 0 to 4, and preferably from 0 to 2, and n represents an integer from 0 to 2, and preferably from 0 to 1.)

Specific examples of the compound (a) include episulfides such as bis(β-epithiopropyl)sulfide, bis(β-epithiopropyl)disulfide, bis(β-epithiopropylthio)methane, 1,2-bis(β-epithiopropylthio)ethane, 1,3-bis(β-epithiopropylthio)propane and 1,4-bis(β-epithiopropylthio)butane. As the compound (a), such compounds may be used solely, or two or more compounds may be used in combination.

Among the above-described compounds, bis(β-epithiopropyl)sulfide and bis(β-epithiopropyl)disulfide are preferred, and bis(β-epithiopropyl)sulfide is most preferred.

Compound (b)

When the total amount of the compounds (a) to (e) is 100 wt %, the amount of sulfur, which is the compound (b) to be used in the present invention, to be added is usually 0.1 to 5 wt %, preferably 0.3 to 1 wt %, and particularly preferably 0.45 to 0.55 wt %.

The sulfur to be used in the present invention may be in any form. Specifically, the sulfur is finely-powdered sulfur, colloidal sulfur, precipitated sulfur, crystalline sulfur, sublimed sulfur or the like, and is preferably finely-powdered sulfur having fine particles. As the sulfur to be used in the present invention, one type of sulfur may be used solely, or two or more types of sulfurs may be used in combination.

The sulfur to be used in the present invention may be produced by any production method. Examples of methods for producing sulfur include methods of sublimation and purification from natural sulfur ores, methods of mining underground sulfur by means of the melting method, and methods of recovery using, for example, hydrogen sulfide obtained in the process of desulfurization of petroleum oil, natural gas or the like, as a raw material, but any of these production methods may be employed.

It is preferred that the (average) particle size of the sulfur to be used in the present invention is less than 10 mesh, that is, the sulfur is in the form of fine powder having a particle size of less than 10 mesh. When the particle size of the sulfur is more than 10 mesh, it is difficult to dissolve the sulfur completely. For this reason, an undesirable reaction or the like may be caused in the first step to generate a defect. The particle size of the sulfur is more preferably less than 30 mesh, and most preferably less than 60 mesh.

The purity of the sulfur to be used in the present invention is preferably at least 98%, more preferably at least 99.0%, even more preferably at least 99.5%, and most preferably at least 99.9%. When the purity of the sulfur is at least 98%, the color tone of the obtained optical material is improved compared to the case of lower than 98%.

Compound (c)

When the total amount of the compounds (a) to (e) is 100 wt %, the amount of the compound (c) to be used in the present invention to be added is usually 1 to 15 wt %, preferably 2 to 12 wt %, and particularly preferably 5 to 10 wt %. When the amount of the compound (c) to be added is lower than 1 wt %, the strength may be reduced, and when the amount is higher than 15 wt %, the color tone may be reduced. As the compound (c) to be used in the present invention, a compound may be used solely, or two or more compounds may be used in combination. Specifically, preferred examples of the compound (c) include m-xylylene diisocyanate, p-xylylene diisocyanate, m-tetramethyl xylylene diisocyanate, p-tetramethyl xylylene diisocyanate, 1,3-bis(isocyanate methyl)cyclohexane, 1,4-bis(isocyanate methyl)cyclohexane, bis(isocyanate methyl)norbornene and 2,5-diisocyanate-methyl-1,4-dithiane. m-xylylene diisocyanate and p-xylylene diisocyanate are more preferred, and m-xylylene diisocyanate is most preferred.

Compound (d)

When the total amount of the compounds (a) to (e) is 100 wt %, the amount of the compound (d) to be used in the present invention to be added is usually 1 to 15 wt %, preferably 2 to 12 wt %, and particularly preferably 5 to 10 wt %. When the amount of the compound (d) to be added is lower than 1 wt %, the oxidation resistance may be reduced, and when the amount is higher than 15 wt %, the heat resistance may be reduced. As the compound (d) to be used in the present invention, a compound may be used solely, or two or more compounds may be used in combination. Specifically, preferred examples of the compound (d) include bis(2-mercaptoethyl)sulfide, 2,5-bis(2-mercaptoethyl)-1,4-dithiane, 1,3-bis(mercaptomethyl)benzene, 1,4-bis(mercaptomethyl)benzene, 1,2-bis(2-mercaptoethylthio)-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, and 1,1,3,3-tetrakis(mercaptomethylthio) propane. Bis(2-mercaptoethyl)sulfide and 1,3-bis(mercaptomethyl)benzene are more preferred, and bis(2-mercaptoethyl)sulfide is most preferred.

Compound (e)

When the total amount of the compounds (a) to (e) is 100 wt %, the amount of the compound (e) to be used in the present invention to be added is usually 1 to 15 wt %, preferably 2 to 12 wt %, and particularly preferably 5 to 10 wt %. When the amount of the compound (e) to be added is lower than 1 wt %, the heat resistance may be reduced, and when the amount is higher than 15 wt %, the refractive index may be reduced. As the compound (e) to be used in the present invention, a compound may be used solely, or two or more compounds may be used in combination. Specifically, preferred examples of the compound (e) include pentaerythritol tetrakis-mercaptopropionate, pentaerythritol tetrakis-thioglycolate, trimethylolpropane tris(2-mercapto acetate) and trimethylolpropane tris(3-mercapto propionate), and pentaerythritol tetrakis-mercaptopropionate is most preferred.

Ratios of Compounds (c) to (e)

Moreover, the ratio of all the SH groups in the compound (d) and the compound (e) to the NCO groups in the compound (c), i.e., [the total number of the SH groups in the compound (d) and the compound (e)/the number of the NCO groups in the compound (c)] (SH group/NCO group) is preferably 1.0 to 2.5, more preferably 1.25 to 2.25, and even more preferably 1.5 to 2.0. When the above-described ratio is less than 1.0, a cured product may turn yellow, and when the ratio is more than 2.5, the heat resistance may be reduced.

The ratio of the SH groups in the compound (d) to the SH groups in the compound (e), i.e., the number of the SH groups in the compound (d)/the number of the SH groups in the compound (e) is 1.0 to 2.0, preferably 1.25 to 1.75, and more preferably 1.4 to 1.7. When the above-described ratio is more than 2.0, the heat resistance may be reduced. Meanwhile, when the above-described ratio is less than 1.0, the obtained optical material may turn yellow.

Polymerization Catalyst

According to the production method of the present invention, at the time of obtaining the optical material, it is preferred to add a polymerization catalyst to the compound (a), the compound (b), the compound (c), the compound (d) and the compound (e). Alternatively, the resin composition for the optical material preferably contains a polymerization catalyst. As the polymerization catalyst, onium salts, in particular, quaternary ammonium salts, quaternary phosphonium salts, tertiary sulfonium salts and secondary iodonium salts are preferred. Among them, quaternary ammonium salts and quaternary phosphonium salts, which have good compatibility with the resin composition for the optical material, are more preferred, and quaternary phosphonium salts are even more preferred. Specifically, more preferred examples of the polymerization catalyst include quaternary ammonium salts such as tetra-n-butylammonium bromide, triethylbenzyl ammonium chloride, cetyldimethylbenzyl ammonium chloride and 1-n-dodecyl pyridinium chloride and quaternary phosphonium salts such as tetra-n-butylphosphonium bromide and tetraphenyl phosphonium bromide. Among them, triethylbenzyl ammonium chloride and tetra-n-butylphosphonium bromide are even more preferred polymerization catalysts, and tetra-n-butylphosphonium bromide is the most preferred polymerization catalyst.

The amount of the polymerization catalyst to be added cannot be determined categorically because it varies depending on the components of the composition, the mixing ratio and the method for polymerization and curing, but the amount is usually 0.0001 wt % to 10 wt %, preferably 0.001 wt % to 5 wt %, more preferably 0.01 wt % to 1 wt %, and most preferably 0.01 wt % to 0.5 wt % when the total amount of the compound (a), the compound (b), the compound (c), the compound (d) and the compound (e) is 100 wt %. When the amount of the polymerization catalyst to be added is more than 10 wt %, the composition may be rapidly polymerized and colored. When the amount of the polymerization catalyst to be added is less than 0.0001 wt %, the resin composition for the optical material may be insufficiently cured, resulting in poor heat resistance.

The addition of the catalyst may be carried out in any step as long as the catalyst can be dissolved, but preferably, the catalyst is added in the second step. The addition in the second step realizes higher solubility, and the reaction between the compound (c) and the compound (e) is promoted, thereby obtaining a good lens.

Additives

Moreover, in the production of the optical material according to the production method of the present invention, it is surely possible to add publicly-known additives such as an antioxidant, an ultraviolet absorber, a yellowing inhibitor, a blueing agent and a pigment to the compound (a), the compound (b), the compound (c), the compound (d) and the compound (e) to further improve practicability of the optical material obtained.

Preferred examples of the antioxidant include phenol derivatives. Among them, polyhydric phenols and halogen-substituted phenols are preferred compounds, and catechol, pyrogallol and alkyl-substituted catechols are more preferred compounds, and catechol is the most preferred compound.

Preferred examples of the ultraviolet absorber include benzotriazole-based compounds, and 2-(2-hydroxy-5-methylphenyl)-2H-benzotriazol, 5-chloro-2-(3,5-di-tert-butyl-2-hydroxyphenyl)-2H-benzotriazol and 2-(2-hydroxy-4-octylphenyl)-2H-benzotriazol are particularly preferred compounds.

The amount of each of the antioxidant and the ultraviolet absorber to be added is usually 0.01 to 5 wt % when the total amount of the compounds (a) to (e) is 100 wt %.

Further, in the production method of the present invention, when a lens adheres to a mold after polymerization, it is possible to use or add a well-known external and/or internal mold release agent to improve the ability of a cured product obtained to be released from the mold. Examples of the mold release agent include fluorine-based non-ionic surfactants, silicon-based non-ionic surfactants, phosphate esters, acidic phosphate ester manufactured by Stephan, oxyalkylene-type acidic phosphate esters, alkali metal salts of acidic phosphate esters, alkali metal salts of oxyalkylene-type acidic phosphate esters, metal salts of higher fatty acid, higher aliphatic esters, paraffin, wax, higher aliphatic amides, higher aliphatic alcohols, polysiloxanes and aliphatic amine ethylene oxide adducts. These substances may be used solely, or two or more of them may be used in combination. The amount of the mold release agent to be added is usually 0.01 to 0.1 wt % when the total amount of the compounds (a) to (e) is 100 wt %.

When polymerizing and curing the resin composition for the optical material, for the purpose of extension of the pot life, dispersion of heat generated by polymerization, etc., a polymerization modifier may be added to the compound (a), the compound (b), the compound (c), the compound (d) and the compound (e) according to need. Examples of the polymerization modifier include halides of groups 13 to 16 of the long form of the periodic table. Among them, halides of silicon, germanium, tin and antimony are preferred, and chlorides of germanium, tin and antimony, which have an alkyl group, are more preferred. Further, dibutyltin dichloride, butyltin trichloride, dioctyltin dichloride, octyltin trichloride, dibutyldichlorogermanium, butyltrichlorogermanium, diphenyldichlorogermanium, phenyltrichlorogermanium and triphenylantimony dichloride are even more preferred, and dibutyltin dichloride is the most preferred compound. These polymerization modifiers may be used solely, or two or more of them may be used in combination.

The amount of the polymerization modifier to be added is 0.0001 to 5.0 wt %, preferably 0.0005 to 3.0 wt %, and more preferably 0.001 to 2.0 wt % when the total amount of the compounds (a) to (e) is 100 wt %. When the amount of the polymerization modifier to be added is less than 0.0001 wt %, sufficient pot life cannot be ensured in the obtained optical material, and when the amount of the polymerization modifier to be added is more than 5.0 wt %, the resin composition for the optical material may not be sufficiently cured, and the heat resistance of the obtained optical material may be reduced.

Next, the above-described first step to fifth step will be described in detail.

(The First Step)

The first step is a step of dissolving the compound (b) in the compound (a) to obtain a first solution. In this step, dissolution conditions are usually as follows: the dissolution temperature is 10 to 60° C. and the dissolution time is 0.1 to 12 hours; more preferably, the dissolution temperature is 15 to 50° C. and the dissolution time is 0.1 to 6 hours; and particularly preferably the dissolution temperature is 20 to 40° C. and the dissolution time is 0.1 to 2 hours. When the dissolution temperature is lower than 10° C., the dissolution time is increased, and when the dissolution temperature is higher than 60° C., the heat resistance of the optical material is reduced, and these are disadvantageous. The first step may be carried out in the presence of a gas such as air, nitrogen and oxygen, in any sealed atmosphere under ordinary pressure or increased/reduced pressure. Further, in addition to the compound (b), a solid component such as an antioxidant and an ultraviolet absorber may be dissolved simultaneously.

(The Second Step)

The second step is a step of adding the compound (e) to the first solution obtained in the first step and then mixing to obtain a second solution not comprising the compound (d). In this regard, it is preferred that the compound (e) and the first solution obtained in the first step are mixed homogeneously.

Conditions for homogenous mixing, i.e., the temperature and the time are preferably as follows: the temperature is 10 to 20° C. and the time is 0.1 to 1 hour. In the conditions for mixing, when the temperature is lower than 10° C., the viscosity of the second solution is increased. When the temperature for mixing is higher than 20° C., unnecessary polymerization of the first solution that is a reaction solution may be developed.

Dissolving a polymerization catalyst and a polymerization modifier in the compound (e) simultaneously at the time of mixing the compound (e) in the second step is a preferable technique. The addition in the second step realizes higher solubility, and the reaction between the compound (e) and the compound (c) that is mixed in the third step is promoted, thereby obtaining a good lens. Mixing may be carried out in the presence of a gas such as air, nitrogen and oxygen, in any sealed atmosphere under ordinary pressure or increased/reduced pressure.

Note that when the compound (d) is added in this step, in the subsequent third step, the reaction between the compound (d) and the compound (e) is promoted, and a defect where peeling traces are left tends to occur, for example, in the case of a powerful minus lens.

(The Third Step)

The third step is a step of adding the compound (c) to the second solution obtained in the second step to react the obtained mixture to obtain a reaction mixture. It can be achieved by subjecting the mixture to the deaeration treatment using, for example, a vacuum pump, preferably under reduced pressure, specifically under a pressure of 0.01 kPa to 3.33 kPa, and more preferably under a pressure of 0.10 kPa to 0.27 kPa.

In the production method of the present invention, the compound (c) and the compound (e) are partially reacted in the third step before cast-molding the resin composition for the optical material. When cast-molding and polymerizing the resin composition for the optical material obtained by partially reacting the compound (c) with the compound (e), in the optical material obtained by curing, the likelihood of the occurrence of the defect where peeling traces are left is lessened, and the yield of the optical material is further improved.

Specifically, in the third step, 10 to 70% of the compound (c) is reacted with the compound (e). When cast-molding and polymerizing the resin composition for the optical material obtained by reacting 10 to 70% of the compound (c) with the compound (e), in the optical material obtained by curing, the likelihood of the occurrence of striae and white turbidity is particularly lessened, and the yield of the optical material is particularly improved. The reaction rate of the compound (c) with the compound (e) is preferably 20 to 60%, and particularly preferably 30 to 50%.

The reaction rate of the compound (c) in the third step is calculated by analyzing the resin composition for the optical material by liquid chromatography (GPC mode, RID detector). In this regard, when the reaction rate is 0%, it means that the compound (c) did not react, and when the reaction rate of the compound (c) is higher than 0%, it means that the compound (c) reacted.

After confirming that the reaction rate of the compound (c) is 10 to 70%, the compound (d) is added in the fourth step. When the consumption rate, i.e., the reaction rate of the compound (c) is 10% or higher, the defect where peeling traces are left is further improved compared to the case where the reaction rate is lower than 10%. When the reaction rate is 70% or lower, the defect where peeling traces are left is further improved compared to the case where the reaction rate is higher than 70%.

The conditions for reacting the compound (c) with the compound (e) in the third step, specifically, the reaction temperature and the reaction time are as follows: usually, the reaction temperature is 0 to 30° C. and the reaction time is 0.5 to 12 hours; more preferably, the reaction temperature is 5 to 25° C. and the reaction time is 1 to 6 hours; and particularly preferably, the reaction temperature is 10 to 20° C. and the reaction time is 2 to 4 hours. Regarding the reaction conditions, when the reaction temperature is lower than 0° C., the process time becomes longer, and when the reaction temperature is higher than 30° C., it may become difficult to control the reaction between the compound (c) and the compound (e).

In the method for producing a resin composition for an optical material of the present invention, it is preferred to carry out the deaeration treatment in advance. Preferably, the deaeration treatment is carried out in the third step. The treatment condition, specifically, the pressure in a container containing a mixture in the sealed state is preferably 0.01 kPa to 3.33 kPa, more preferably 0.05 kPa to 1.33 kPa, and particularly preferably 0.10 kPa to 0.27 kPa. Components removed by the deaeration treatment are mainly dissolved gases such as hydrogen sulfide, low-boiling substances such as low-molecular-weight thiol, etc. When the deaeration treatment is carried out at a vacuum degree higher than 3.33 kPa, dissolved gases may remain to reduce the transparency of the optical material. When the deaeration treatment is carried out at a vacuum degree lower than 0.01 kPa, it may become difficult to carry out the operation due to vigorous foam formation.

(The Fourth Step)

The fourth step is a step of adding the compound (d) to the reaction mixture obtained in the third step and then mixing to obtain a resin composition for an optical material.

The conditions for mixing the compound (d) with the reaction mixture, specifically, the temperature and the time are usually as follows: the mixing temperature is 10 to 20° C. and the mixing time is 0.1 to 1 hour. Regarding the mixing conditions, when the mixing temperature is lower than 10° C., the process time becomes longer, and when the mixing temperature is higher than 20° C., it may become difficult to control the reaction between the compound (d) and the compound (c). In this regard, the deaeration treatment may be carried out simultaneously with mixing of the compound (d) with the reaction mixture. In this case, the conditions for the deaeration treatment are the same as those of the third step described above.

(The Fifth Step)

The fifth step is a step of cast-molding the resin composition for an optical material obtained in the fourth step and then polymerizing to obtain the optical material.

At the time of cast-molding the resin composition for the optical material of the present invention in the fifth step, it is preferred to filter and remove impurities using, for example, a filter having a pore diameter of about 0.1 to 5 µm in terms of improving the quality of the optical material of the present invention.

The resin composition for the optical material of the present invention is usually polymerized in the fifth step as described below. Specifically, the curing time is usually 1 to 100 hours, and the curing temperature is usually −10° C. to 140° C. The polymerization is conducted by carrying out a step of retaining the composition at a predetermined polymerization temperature for a predetermined amount of time, a step of increasing the temperature at a rate of 0.1° C. to 100° C./h and a step of decreasing the temperature at a rate of 0.1° C. to 100° C./h, or a combination of these steps. Further, it is preferred to anneal the obtained optical material at a temperature of 50 to 150° C. for about 10 minutes to 5 hours after curing is completed in terms of eliminating distortion of the optical material of the present invention. Moreover, the obtained optical material may be subjected to a surface treatment such as dyeing, hard coating, impact-resistant coating, antireflection treatment and imparting antifog properties according to need.

EXAMPLES

Hereinafter, the present invention will be specifically described by way of working examples and comparative examples. However, the present invention is not limited to the below-described working examples.

The defect where peeling traces are left on each of optical materials obtained by methods of the below-described working examples and comparative examples was evaluated in a manner described below.

A resin composition for an optical material was injected into a −10D lens mold having an edge thickness of 15 mm and a mold diameter of 75 mm composed of two glass plates and a tape, and it was heated at 30° C. for 30 hours, then the temperature was elevated to 100° C. over 10 hours at a constant rate, and finally, the composition was heated at 100° C. for 1 hour to be polymerized and cured. After cooling, the obtained product was released from the mold and annealed at 110° C. for 60 minutes, and after that, the surface condition thereof was visually observed. 10 products were produced, and the case where no peeling trace was left on every product was rated as "A", the case where peeling traces were left on 1 product was rated as "B", the case where peeling traces were left on 2 products was rated as "C", and the case where peeling traces were left on 3 or more products was rated as "D". A to C are regarded as acceptable.

Example 1

The first step: 790 g of bis(β-epithiopropyl)sulfide (hereinafter referred to as the compound (a)), 5 g of sulfur as the compound (b), 0.5 g of catechol as an antioxidant, and 10 g of 2-(2-hydroxy-4-octylphenyl)-2H-benzotriazol as a ultraviolet absorber were homogeneously mixed at 30° C. for 1 hour to obtain a first solution. After that, the first solution was cooled to 10° C.

The second step: 66 g of pentaerythritol tetrakis-mercaptopropionate (hereinafter referred to as the compound (e)), 1 g of tetra-n-butylphosphonium bromide and 0.1 g of dibutyltin dichloride were well mixed homogeneously at a mixing temperature of 20° C., and after that, the obtained mixture was added to the first solution and stirred homogenously at a mixing temperature of 15° C. for 30 minutes to obtain a second solution.

The third step: 0.1 g of Zelec UN (manufactured by Stepan) as a mold release agent and 71 g of m-xylylene diisocyanate (hereinafter referred to as the compound (c)) were well mixed homogeneously at 20° C., and then added to the second solution. The obtained mixture was subjected to the deaeration treatment and stirring at a reaction temperature of 15° C. at a vacuum degree of 0.27 kPa for 2.5 hours to react the mixture, thereby obtaining a reaction mixture. 2.5 hours later, the reaction mixture was set in GPC (a column manufactured by Shodex, K-802) to measure the reaction rate of the compound (c) by GPC. As a result, it was confirmed that 33% of the compound (c) reacted.

The fourth step: 68 g of bis(2-mercaptoethyl)sulfide (hereinafter referred to as the compound (d)) was added to the reaction mixture in a reaction flask, and it was subjected to the deaeration treatment and stirring at 15° C. for 30 minutes at a vacuum degree of 0.27 kPa, thereby obtaining a resin composition for an optical material.

The fifth step: The resin composition for an optical material obtained in the fourth step was injected into a −10D lens mold having an edge thickness of 15 mm and a mold diameter of 75 mm composed of two glass plates and a tape, and it was heated at 30° C. for 30 hours, then the temperature was elevated to 100° C. over 10 hours at a constant rate, and finally, the composition was heated at 100° C. for 1 hour to be polymerized and cured. After cooling, the obtained product was released from the mold and annealed at 110° C. for 60 minutes, and after that, the surface condition thereof was visually observed. The result regarding peeling traces on the obtained optical material is shown in Table 1.

Example 2

An optical material was obtained in a manner similar to that in Example 1, except that the time for the deaeration treatment and stirring in the third step was 3 hours and the reaction rate of the compound (c) was 48%. The result is shown in Table 1.

Example 3

An optical material was obtained in a manner similar to that in Example 1, except that the temperature for the deaeration treatment and stirring in the third step were 10° C. and 2.5 hours and the reaction rate of the compound (c) was 22%. The result is shown in Table 1.

Example 4

An optical material was obtained in a manner similar to that in Example 1, except that the temperature for the deaeration treatment and stirring in the third step were 25° C. and 2 hours and the reaction rate of the compound (c) was 57%. The result is shown in Table 1.

Example 5

An optical material was obtained in a manner similar to that in Example 1, except that the temperature for the deaeration treatment and stirring in the third step were 10° C. and 1.5 hours and the reaction rate of the compound (c) was 10%. The result is shown in Table 1.

Example 6

An optical material was obtained in a manner similar to that in Example 1, except that the temperature for the deaeration treatment and stirring in the third step were 30° C. and 3 hours and the reaction rate of the compound (c) was 70%. The result is shown in Table 1.

Comparative Example 1

To 790 g of the compound (a), 5 g of the compound (b), 71 g of the compound (c), 68 g of the compound (d), 66 g of the compound (e), 1 g of tetra-n-butylphosphonium bromide, 0.1 g of dibutyltin dichloride, 0.5 g of catechol as an antioxidant, 1 g of 2-(2-hydroxy-4-octylphenyl)-2H-benzotriazol as a ultraviolet absorber and 0.1 g of Zelec UN (manufactured by Stepan) as a mold release agent were added and mixed at 15° C. for 10 minutes, and after that, the mixture was stirred at 15° C. for 2.5 hours. The reaction rate of the compound (c) at that time was 50%. After that, the resin composition for an optical material was injected into a −10D lens mold having an edge thickness of 15 mm and a mold diameter of 75 mm composed of two glass plates and a tape, and it was heated at 30° C. for 30 hours, then the temperature was elevated to 100° C. over 10 hours at a constant rate, and finally, the composition was heated at 100° C. for 1 hour to be polymerized and cured. After cooling, the obtained product was released from the mold and annealed at 110° C. for 60 minutes, and after that, the surface condition thereof was visually observed. The result regarding peeling traces on the obtained optical material is shown in Table 1.

Comparative Example 2

68 g of the compound (d) that should be added in the fourth step was added simultaneously with the compound (e) in the second step. Specifically, the procedure described below was carried out.

The first step: 790 g of the compound (a), 5 g of the compound (b), 0.5 g of catechol as an antioxidant, and 10 g of 2-(2-hydroxy-4-octylphenyl)-2H-benzotriazol as a ultraviolet absorber were homogeneously mixed at 30° C. for 1 hour to obtain a first solution. After that, the first solution was cooled to 10° C.

The second step: 68 g of the compound (d), 66 g of the compound (e), 1 g of tetra-n-butylphosphonium bromide and 0.1 g of dibutyltin dichloride were well mixed homogeneously at a mixing temperature of 20° C., and after that, the obtained mixture was added to the first solution and stirred homogenously at a mixing temperature of 15° C. for 30 minutes to obtain a second solution.

The third step: 0.1 g of Zelec UN (manufactured by Stepan) as a mold release agent and 71 g of m-xylylene diisocyanate (hereinafter referred to as the compound (c)) were well mixed homogeneously at 20° C., and then added to the second solution. The obtained mixture was subjected to the deaeration treatment and stirring at a reaction temperature of 15° C. at a vacuum degree of 0.27 kPa for 2.5 hours to react the mixture, thereby obtaining a reaction mixture. 2.5 hours later, the reaction mixture was set in GPC (a column manufactured by Shodex, K-802) to measure the reaction rate of the compound (c) by GPC. As a result, it was confirmed that 50% of the compound (c) reacted.

The fourth step: The mixture was subjected to the deaeration treatment and stirring at 15° C. for 30 minutes at a vacuum degree of 0.27 kPa, thereby obtaining a resin composition for an optical material.

The fifth step: The resin composition for an optical material obtained in the fourth step was injected into a −10D lens mold having an edge thickness of 15 mm and a mold diameter of 75 mm composed of two glass plates and a tape, and it was heated at 30° C. for 30 hours, then the temperature was elevated to 100° C. over 10 hours at a constant rate, and finally, the composition was heated at 100° C. for 1 hour to be polymerized and cured. After cooling, the obtained product was released from the mold and annealed at 110° C. for 60 minutes, and after that, the surface condition thereof was visually observed. The result is shown in Table 1.

Comparative Example 3

A part of the compound (d) that should be added in the fourth step was added simultaneously with the compound (e) in the second step. Specifically, the procedure described below was carried out.

The first step: 790 g of the compound (a), 5 g of the compound (b), 0.5 g of catechol as an antioxidant, and 10 g of 2-(2-hydroxy-4-octylphenyl)-2H-benzotriazol as a ultraviolet absorber were homogeneously mixed at 30° C. for 1 hour to obtain a first solution. After that, the first solution was cooled to 10° C.

The second step: 1 g of the compound (d), 66 g of the compound (e), 1 g of tetra-n-butylphosphonium bromide and 0.1 g of dibutyltin dichloride were well mixed homogeneously at a mixing temperature of 20° C., and after that, the obtained mixture was added to the first solution and stirred homogenously at a mixing temperature of 15° C. for 30 minutes to obtain a second solution.

The third step: 0.1 g of Zelec UN (manufactured by Stepan) as a mold release agent and 71 g of m-xylylene diisocyanate (hereinafter referred to as the compound (c)) were well mixed homogeneously at 20° C., and then added to the second solution. The obtained mixture was subjected to the deaeration treatment and stirring at a reaction temperature of 15° C. at a vacuum degree of 0.27 kPa for 2.5 hours to react the mixture, thereby obtaining a reaction mixture. 2.5 hours later, the reaction mixture was set in GPC (a column manufactured by Shodex, K-802) to measure the reaction rate of the compound (c) by GPC. As a result, it was confirmed that 50% of the compound (c) reacted.

The fourth step: 67 g of the compound (d) was added to the reaction mixture in a reaction flask, and it was subjected to the deaeration treatment and stirring at 15° C. for 30 minutes at a vacuum degree of 0.27 kPa, thereby obtaining a resin composition for an optical material.

The fifth step: The resin composition for an optical material obtained in the fourth step was injected into a −10D lens mold having an edge thickness of 15 mm and a mold diameter of 75 mm composed of two glass plates and a tape, and it was heated at 30° C. for 30 hours, then the temperature was elevated to 100° C. over 10 hours at a constant rate, and finally, the composition was heated at 100° C. for 1 hour to be polymerized and cured. After cooling, the obtained product was released from the mold and annealed at 110° C. for 60 minutes, and after that, the surface condition thereof was visually observed. The result is shown in Table 1.

Comparative Example 4

An optical material was obtained in a manner similar to that in Example 1, except that the temperature for the deaeration treatment and stirring in the third step were 0° C. and 5 hours and the reaction rate of the compound (c) was 50%. The result is shown in Table 1.

Comparative Example 5

An optical material was obtained in a manner similar to that in Example 1, except that the temperature for the deaeration treatment and stirring in the third step were 35° C. and 4.5 hours and the reaction rate of the compound (c) was 80%. The result is shown in Table 1.

TABLE 1

| Examples and Comparative Examples | Peeling traces |
|---|---|
| Example 1 | A |
| Example 2 | A |
| Example 3 | B |
| Example 4 | B |
| Example 5 | C |
| Example 6 | C |
| Comparative Example 1 | D |
| Comparative Example 2 | D |
| Comparative Example 3 | D |
| Comparative Example 4 | D |
| Comparative Example 5 | D |

The invention claimed is:
1. A method for producing an optical material comprising a compound (a), a compound (b), a compound (c), a compound (d) and a compound (e) described below as raw materials, comprising:
   (i): dissolving the compound (b) in the compound (a) to obtain a first solution;
   (ii): adding the compound (e) to the first solution obtained in (i) and then mixing to obtain a second solution not comprising the compound (d);
   (iii): adding the compound (c) to the second solution obtained in (ii) to react 10 to 70% of the compound (c) with the compound (e) to obtain a reaction mixture;
   (iv): adding the compound (d) to the reaction mixture obtained in (iii) and then mixing to obtain a resin composition for an optical material;
   (v): cast-molding the resin composition for an optical material obtained in (iv) and then polymerizing to obtain the optical material;
   the compound (a): a compound having the structure represented by the following formula (1):

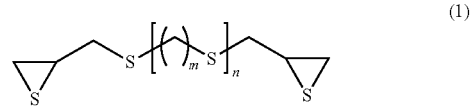

(1)

wherein m represents an integer from 0 to 4, and n represents an integer from 0 to 2;
the compound (b): sulfur;
the compound (c): at least one compound selected from m-xylylene diisocyanate, p-xylylene diisocyanate, m-tetramethyl xylylene diisocyanate, p-tetramethyl xylylene diisocyanate, 1,3-bis(isocyanate methyl)cyclohexane, 1,4-bis(isocyanate methyl)cyclohexane, bis(isocyanate methyl)norbornene and 2,5-diisocyanatemethyl-1,4-dithiane;

the compound (d): at least one compound selected from bis(2-mercaptoethyl)sulfide, 2,5-bis(2-mercaptoethyl)-1,4-dithiane, 1,3-bis(mercaptomethyl)benzene, 1,4-bis(mercaptomethyl)benzene, 1,2-bis(2-mercaptoethylthio)-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, and 1,1,3,3-tetrakis(mercaptomethylthio)propane;

the compound (e): at least one compound selected from pentaerythritol tetrakis-mercaptopropionate, pentaerythritol tetrakis-thioglycolate, trimethylolpropane tris(2-mercapto acetate) and trimethylolpropane tris(3-mercapto propionate).

2. The method for producing an optical material according to claim 1, wherein, when the total amount of the compound (a), the compound (b), the compound (c), the compound (d) and the compound (e) is 100 wt %, the compound (a) is in an amount of 60 to 95 wt %; the compound (b) is in an amount of 0.1 to 5 wt %; the compound (c) is in an amount of 1 to 15 wt %; the compound (d) is in an amount of 1 to 15 wt %; and the compound (e) is in an amount of 1 to 15 wt %, and wherein the ratio of all the SH groups in the compound (d) and the compound (e) to the NCO groups in the compound (c), i.e., [the total number of the SH groups in the compound (d) and the compound (e)/the number of the NCO groups in the compound (c)] (SH group/NCO group) is 1.0 to 2.5.

3. The method for producing an optical material according to claim 1, wherein an onium salt, as a polymerization catalyst, is added in an amount of 0.0001 to 10 wt % relative to the total amount of (a) to (e) in the second step.

4. The method for producing an optical material according to claim 1, wherein in (iii) the reaction temperature is 0 to 30° C. and the reaction time is 0.5 to 12 hours.

5. A method for producing a resin composition for an optical material comprising a compound (a), a compound (b), a compound (c), a compound (d) and a compound (e) described below as raw materials, comprising:

(i): dissolving the compound (b) in the compound (a) to obtain a first solution;

(ii): adding the compound (e) to the first solution obtained in (i) and then mixing to obtain a second solution not comprising the compound (d);

(iii): adding the compound (c) to the second solution obtained in (ii) to react 10 to 70% of the compound (c) with the compound (e) to obtain a reaction mixture;

(iv): adding the compound (d) to the reaction mixture obtained in (iii) and then mixing to obtain the resin composition for an optical material;

the compound (a): a compound having the structure represented by the following formula (1):

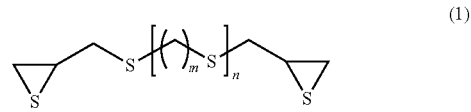

wherein m represents an integer from 0 to 4, and n represents an integer from 0 to 2;

the compound (b): sulfur;

the compound (c): at least one compound selected from m-xylylene diisocyanate, p-xylylene diisocyanate, m-tetramethyl xylylene diisocyanate, p-tetramethyl xylylene diisocyanate, 1,3-bis(isocyanate methyl)cyclohexane, 1,4-bis(isocyanate methyl)cyclohexane, bis(isocyanate methyl)norbornene and 2,5-diisocyanatemethyl-1,4-dithiane;

the compound (d): at least one compound selected from bis(2-mercaptoethyl)sulfide, 2,5-bis(2-mercaptoethyl)-1,4-dithiane, 1,3-bis(mercaptomethyl)benzene, 1,4-bis(mercaptomethyl)benzene, 1,2-bis(2-mercaptoethylthio)-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, and 1,1,3,3-tetrakis(mercaptomethylthio)propane;

the compound (e): at least one compound selected from pentaerythritol tetrakis-mercaptopropionate, pentaerythritol tetrakis-thioglycolate, trimethylolpropane tris(2-mercapto acetate) and trimethylolpropane tris(3-mercapto propionate).

* * * * *